Jan. 5, 1960     B. B. BROOKHYSER ET AL     2,919,820
MAT TRANSFER APPARATUS
Filed Feb. 21, 1956     4 Sheets-Sheet 1
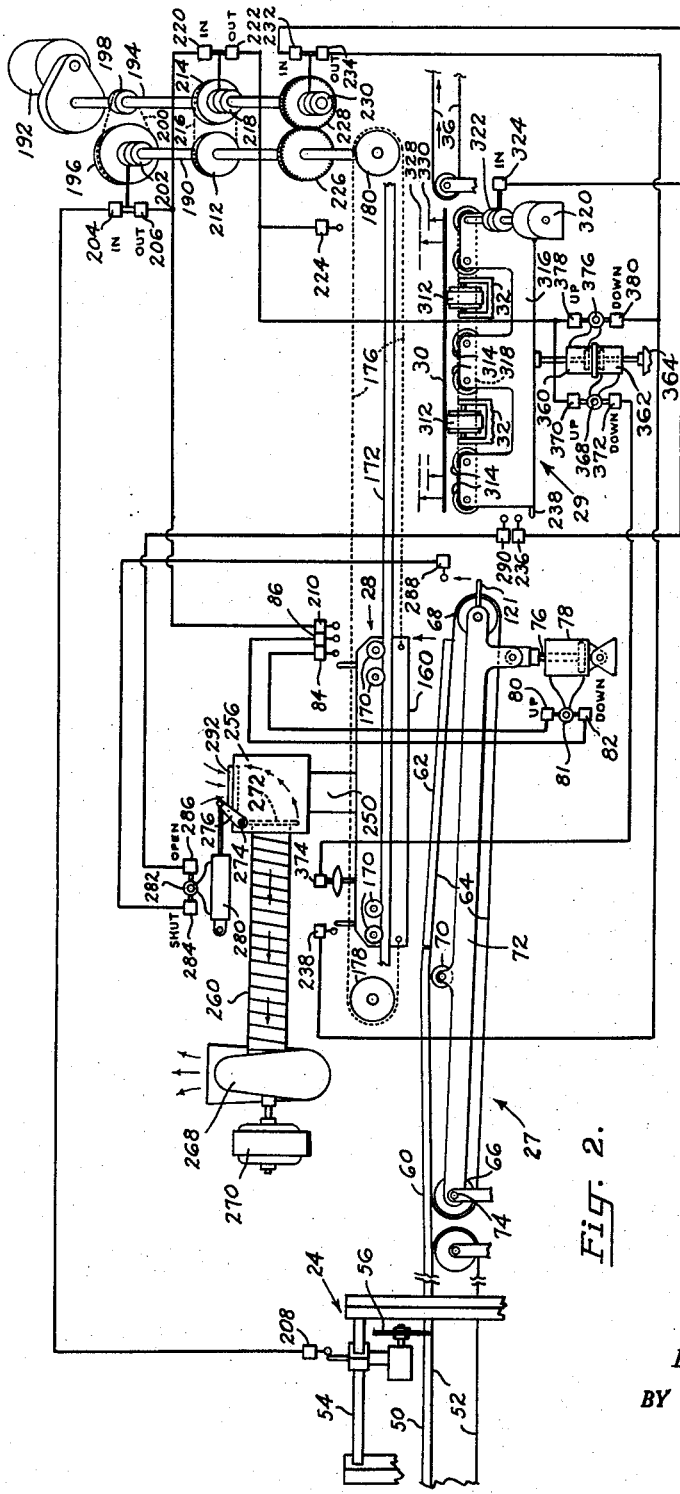
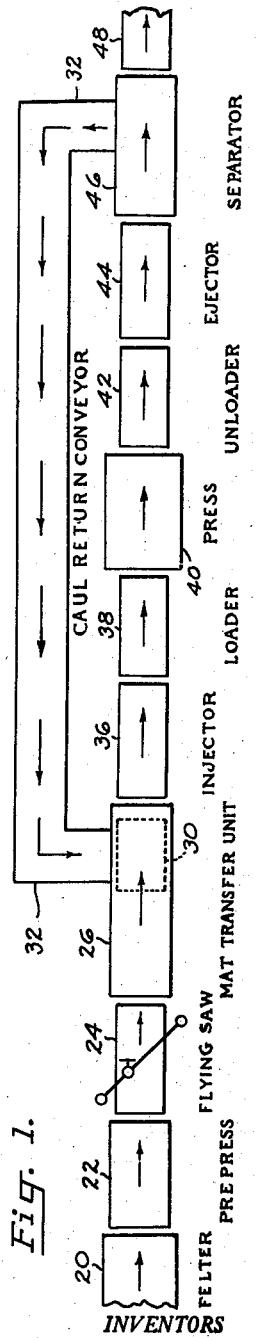
INVENTORS
Byron B. Brookhyser
Harold E. Erickson
Dale L. Schubert
BY
Atty.

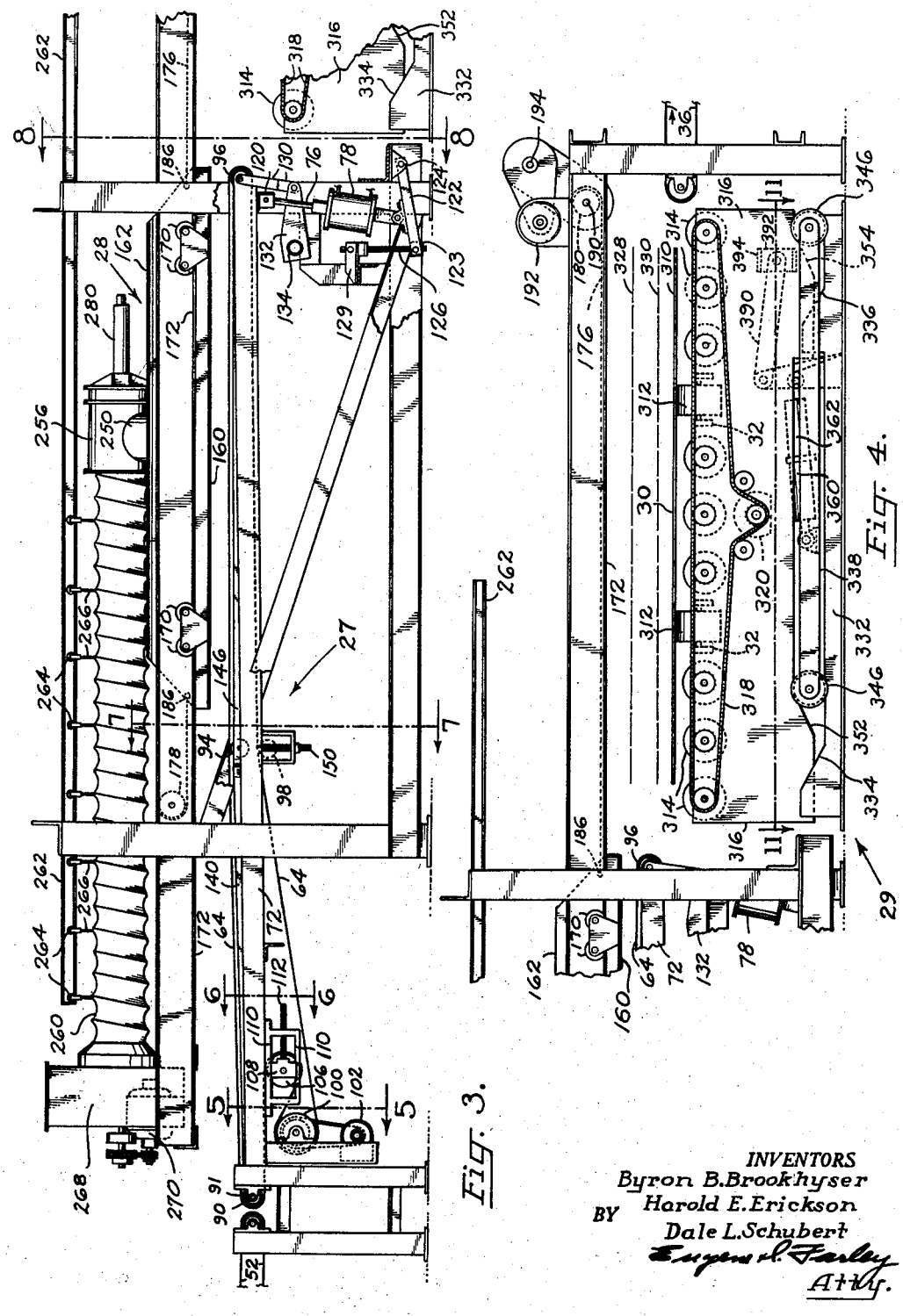

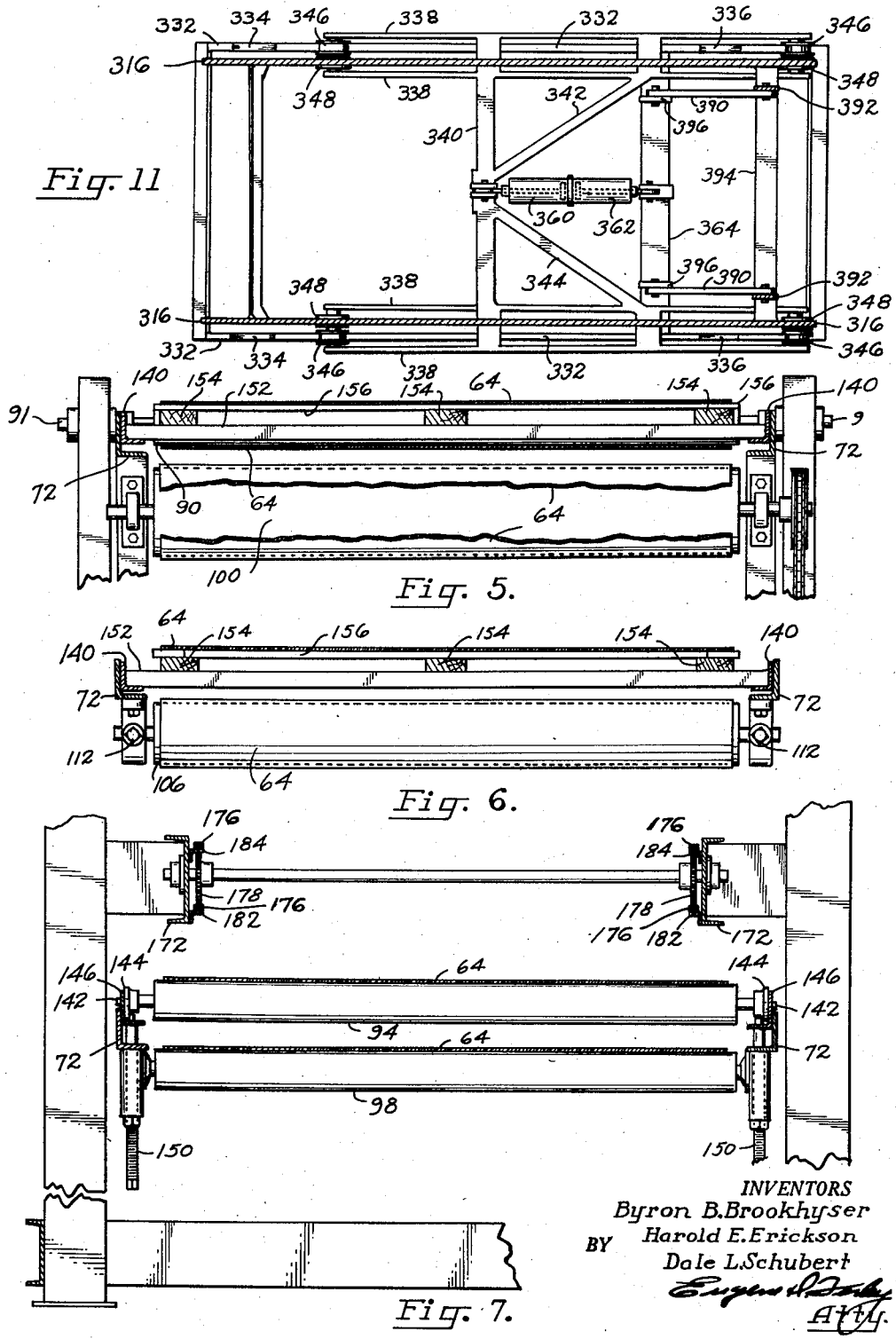

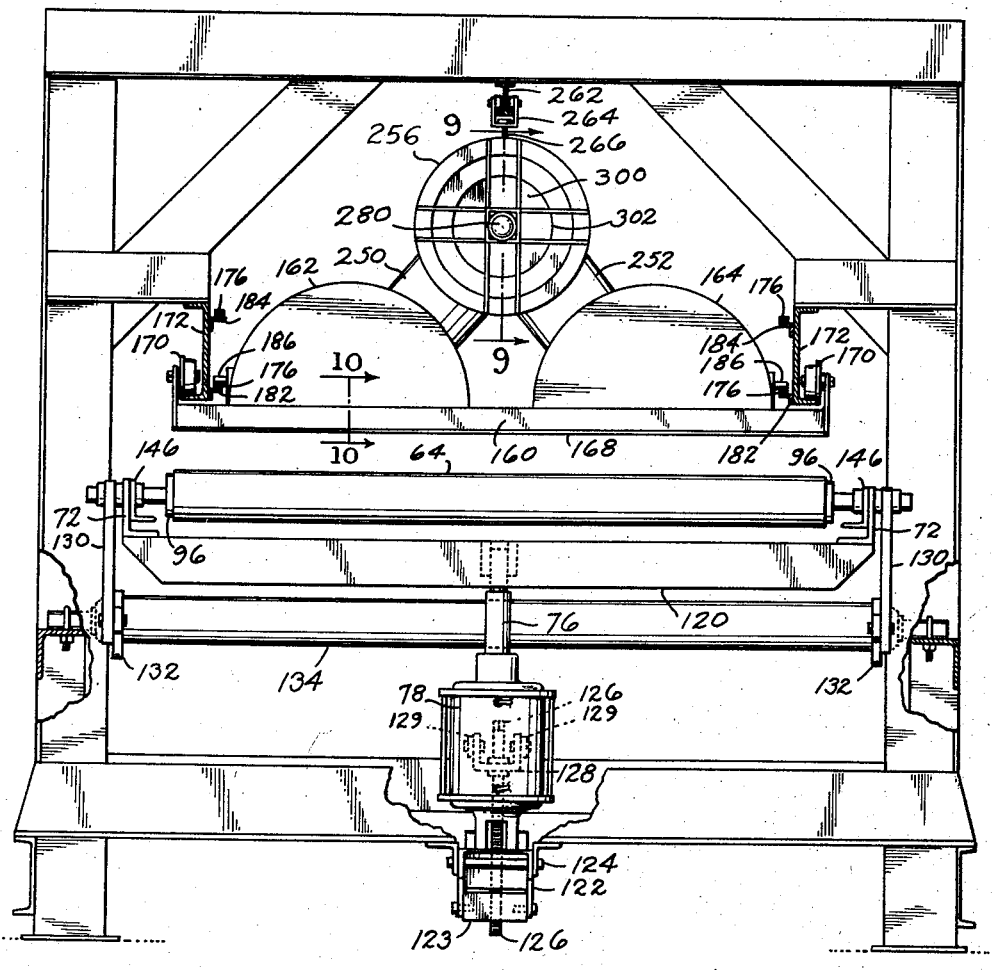
Fig. 8.
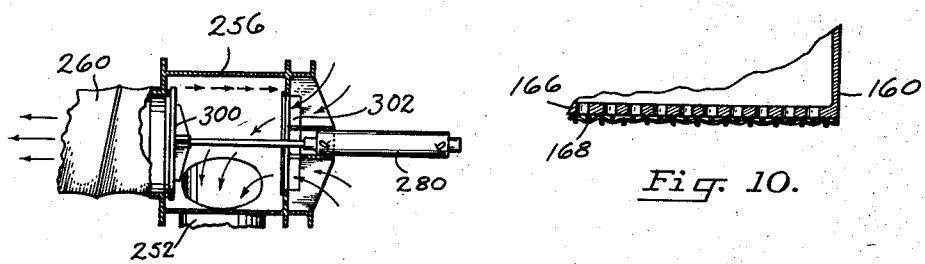
Fig. 9.
Fig. 10.
INVENTORS
Byron B. Brookhyser
Harold E. Erickson
Dale L. Schubert
BY United States Patent Office 2,919,820
Patented Jan. 5, 1960

2,919,820

MAT TRANSFER APPARATUS

Byron B. Brookhyser, Milton, Harold E. Erickson, Auburn, and Dale L. Schubert, Tacoma, Wash.; said Brookhyser and said Erickson assignors, by direct and mesne assignments, of one-sixth to said Schubert, and one-half to Industrial Development Co., Tacoma, Wash., a corporation of Washington Application February 21, 1956, Serial No. 566,872

16 Claims. (Cl. 214—1)

This invention relates to apparatus for transferring from one location to another mats comprised of lignocellulose and other particles such as are used in composition board manufacture.

In the manufacture of hardboard and other composition board, lignocellulose particles are formed into a mat which is placed on a caul plate. Mat and caul plate then are transferred to a press where the mat is consolidated to the desired density and thickness. To accomplish this sequence, apparatus may be required for transferring the mat first to the caul plate and next to the press.

It is the general object of this invention to provide apparatus for transferring a lignocellulose mat of substantial dimensions onto a caul plate rapidly, efficiently, and without damage to the mat which, because of its non-coherent character, is subject to damage if not handled carefully.

It is another object of this invention to provide mat transfer apparatus which makes possible substantially automatic operation of a composition board plant with a minimum crew.

It is another object of this invention to provide mat transfer apparatus which is capable of picking up a moving mat and transferring it to another location without arresting the movement of the mat.

It is another object of this invention to provide mat transfer apparatus which is designed to pick up a selected one of a succession of closely adjacent move mats and moving it at an increased rate to another location, thereby serving the secondary but important function of a mat speed changer and permitting the operation of an automatic timing cycle governing the mat handling sequence.

It is another object of this invention to provide mat transfer apparatus which includes a minimum number of mechanical units.

It is another object of this invention to provide mat transfer apparatus which is light in weight and fast in operation.

It is another object of this invention to provide mat transfer apparatus which positions the mat accurately in the desired location.

The manner in which the foregoing and other objects of this invention are accomplished will be apparent from the accompanying specification and claims considered together with the accompanying drawings, wherein like numerals of reference indicate like parts and wherein:

Fig. 1 is a flow plan of a composition board plant including the herein described mat transfer apparatus;

Fig. 2 is a schematic illustration of the herein described mat transfer apparatus illustrating its basic manner of functioning;

Fig. 3 is a view in side elevation, partly in section, of a pivoting conveyor and a vacuum hood which are components of the herein described mat transfer apparatus;

Fig. 4 is a view in side elevation of a jump conveyor which also is a component of the presently described mat transfer apparatus;

Fig. 5 is a sectional view taken along the line 5—5 of Fig. 3 and illustrating the construction of the pivoting end of the pivoting conveyor;

Fig. 6 is a sectional view taken along line 6—6 of Fig. 3 and further illustrating the pivoting end of the pivoting conveyor;

Fig. 7 is a sectional view taken along line 7—7 of Fig. 3 and illustrating a means employed for adjusting the height of the pivoting conveyor;

Fig. 8 is a sectional view taken along line 8—8 of Fig. 3 illustrating the mechanism used for pivoting the pivoting conveyor and illustrating also the construction of the vacuum hood;

Figs. 9 and 10 are detail sectional views taken along lines 9—9, 10—10 of Fig. 8 and illustrating details of the vacuum hood; and Fig. 11 is a plan view partly in section, illustrating the construction of the jump conveyor further shown in Fig. 4.

*General plan*

Fig. 1 sets forth a flow plan for following the progress of a mat through a composition board plant which includes the presently described mat transfer apparatus as an essential component. The mat may be formed of small pieces or particles of lignocellulose, for example, particles of straw, cane, bagasse, and particularly the woods of various tree species. These particles may be in the form of chips, shavings, fibers, granules, or sawdust. If desired, they may be mixed with predetermined quantities of extraneous thermoplastic or thermosetting binders such as the phenol-aldehyde resins, and with added sizing materials.

The mats may be formed in any suitable type of felting apparatus, indicated in the flow plan at 20. The mat is formed continuously and passes continuously to a prepress 22 where it is partially consolidated, for example from a thickness of about 8 inches to a thickness of about 2 inches. This makes the mat partially self-sustaining so that it may be passed more easily through the subsequent stages of the plant operation.

The partially consolidated, continuous mat then may be passed through a flying saw 24 which cuts it into lengths of the desired size. In a typical case, the mats thus formed may measure approximately 4 feet wide and 8 feet long.

Each individual mat is passed to a mat transfer unit 26 which includes a pivoting conveyor 27, a vacuum hood 28 and a jump conveyor 29 (Fig. 2). The vacuum hood carries the mat at an accelerated rate, thereby separating it from the succeeding mats, to a station where it is superimposed above a caul plate 30 which rests on a caul return or side conveyor 32. The caul plate also is spaced above jump conveyor 29.

At the proper instant the jump conveyor elevates, lifting the caul plate off the side conveyor and placing it directly adjacent the mat carried by the advanced vacuum hood. Thereupon the vacuum is released, depositing the mat on the caul plate.

The jump conveyor then lowers to an intermediate position and passes the plate and superimposed mat onto an off-bearing conveyor 36. It then drops to its starting position and a new caul plate is placed above it by side conveyor 32. Also, vacuum hood 28 returns to its starting position ready for the initiation of another cycle.

Off-bearing conveyor 36 serves as an injector for injecting the mat-caul plate assembly into a multi-opening press loader 38. This is loaded stepwise with from ten to twenty assemblies and transfers them to the multi-opening press 40.

In the press the mats are consolidated to the selected thickness and density. This requires a time interval for example, of from 5 to 20 minutes during which time the press loader receives another charge of mats. At the end of the pressing period the press is discharged into a press unloader 42. This in turn is emptied one mat unit at a time by ejector 44.

The ejector passes each caul plate with its superimposed, consolidated mat onto a separator 46 which has for its function separation of the mat from the caul plate to which it adheres. The mats then pass onto a conveyor 48 which conveys them to post-press processing, for example, humidification or tempering. The caul plates, however, are transferred to side conveyor 32. This returns them to the mat transfer apparatus which is the subject matter of the present invention.

Considering the foregoing in greater detail and with particular reference to the drawings.

The pivoting conveyor

As indicated above, the continuous mat 50 produced in felter 20 and partially consolidated in pre-press 22 is cut into sections by a flying saw unit 24. It is conveyed beneath the saw on a conveyor 52. A saw carriage 54 is stationed diagonally across the mat. The saw 56 is power driven and moves diagonally across the mat on the saw carriage at a rate correlated with the rate of movement of the mat so that a square cut is obtained. This forms a plurality of closely abutting mat sections, two of which are indicated at 60, 62.

The mat sections pass from conveyor 52 onto the pivoting conveyor 27. As illustrated schematically in Fig. 2, this conveyor includes a conveyor belt 64 reeved about end rollers 66, 68 and over the centrally located supporting roller 70. One or more of these rollers is powered so that the conveyor belt is driven in the feed direction.

Rollers 66—70 are rotatably mounted on a frame 72. The infeed end of this frame is pivotally mounted on a shaft 74 which may also mount roller 66.

The outfeed end of frame 72 is supported by the piston rod 76 of a fluid operated cylinder 78. The flow of fluid to the cylinder is controlled electrically by a valve 81 operated by a solenoid 80, energization of which causes an extension of the piston rod, and by a solenoid 82, energization of which causes retraction of the piston rod. The solenoids in turn are energized by switches 84, 86 respectively. Accordingly the outfeed end of frame 72, and hence of belt 64 may be raised or lowered.

A suitable construction for the pivoting conveyor is illustrated in greater detail in Figs. 3 and 5–8 inclusive.

The unit of these figures includes the belt 64, frame 72 and cylinder 78 of the schematically illustrated device of Fig. 2 and in addition includes units for tensioning the conveyor belt, for controlling the tilting of the same for stabilizing it, for maintaining the working stretch of the belt substantially horizontal when the frame is tilted so that vacuum hood 28 can engage a mat effectively in all vertical adjustments of the conveyor, and for maintaining the belt level when loaded.

To maintain the belt under tension, it is passed about a terminal idler pulley 90 (Fig. 3) rotatably mounted on shaft 91 at the infeed end of the apparatus, an upper central idler pulley 94, an outfeed terminal idler pulley 96, a lower central idler pulley 98, a driven pulley 100 which is powered by motor 102, and tensioning pulley 106. The shaft of tensioning pulley 106 is mounted in bearings 108 which in turn slide on tracks 110. Screws 112 are connected to the bearings so that the position of the roller may be adjusted as required to tension the conveyor belt.

The means employed for controlling the tilting of conveyor 27 about shaft 91 is illustrated particularly in Figs. 3 and 8. Frame 72 of the conveyor includes at its outfeed end a cross frame member 120 to which the piston rod of cylinder 78 is pivotally connected. Hence as the piston rod is extended and retracted, conveyor 27 is tilted upwardly or downwardly about shaft 91. As it tilts, a contact element 121 affixed to its outfeed end moves correspondingly and hence may be used for actuating an electric switch as will appear hereinafter.

To permit its vertical adjustment, cylinder 78 is pivotally connected at its lower end to lever arm 122 one end of which is pivotally connected to a frame member through pin 124. The free end of arm 122 is pivotally connected to a nut 123 which is in threaded engagement with the lower end of jack screw 126. The upper end of this screw is threaded into a pivotally mounted yoke 128. The latter member in turn is pivotally connected to frame member 129. Accordingly, as jack screw 126 is adjusted, lever arm 122 is moved angularly upwardly or downwardly as the case may be, correspondingly adjusting the vertical position of cylinder 78, and hence of belt 64.

Stabilizing means are present to prevent lateral movement of the conveyor as it tilts upwardly and downwardly. Such means include link members 130, the upper ends of which are pivotally connected to the shaft of roller 96 and the lower ends of which are connected to the outer ends of stabilizing arms 132. The inner ends of these arms are rigid to a shaft 134 which is pivotally mounted between frame members of the conveyor assembly. Hence as the conveyor tilts, its motion is followed by links 130 and arms 132 which exert a stabilizing function and prevent it from moving sideways.

Means also are present for maintaining the working stretch of belt 64 which is opposite vacuum hood 28 substantially horizontal when the frame and belt are tilted upwardly and approach the hood, thereby insuring uniform engagement of the hood with a mat carried by the belt. Accordingly the belt is supported by an adjustable, jointed frame assembly the construction of which is illustrated in Figs. 3, 5, 6 and 7.

This assembly nests within frame 72 and includes the longitudinally disposed upstream angle iron sections 140, the infeed ends of which are pivotally connected to frame 72 (Fig. 5). The outfeed ends of the upstream sections are pivotally connected by pins 142 working in slots to a pair of link members 144 (Fig. 7). These in turn are rigidly connected to downstream angle iron sections 146. The outfeed ends of the latter sections then are pivotally connected to frame 72. Accordingly the central portion of the jointed frame assembly is slidable vertically within frame 72, which acts as a guide.

As is shown particularly in Fig. 7, the shaft of belt-supporting roller 94 is journaled in links 144. This makes possible shifting the vertical position of the roller as required to level off the stretch of belt 64 immediately opposite vacuum hood 28 by adjusting the vertical position of the jointed frame assembly. Such adjustment may be secured in any desired manner, the illustrated means comprising jack screws 150 threaded into a frame member and working against angle iron sections 146 and links 144 in which roller 94 is journaled.

To maintain belt 64 level when supporting the substantial weight of the mats carried by it there are provided a plurality of spaced cross pieces 152 which are supported by angle irons 140 and which span the distance between the angle irons. A plurality of spaced longitudinal pieces 154 are mounted on the cross pieces. A deck 156 then is placed across the longitudinal members and is traversed by belt 64.

The vacuum hood

The construction of the vacuum hood 28 which lifts the individual mats from the pivoting conveyor 26 is illustrated particularly in Figs. 2, 3 and 7–10 inclusive.

It comprises a rectangular chamber 160 above which are placed a pair of communicating, dome-shaped chambers 162, 164. The bottom face of the rectangular chamber has an opening which is substantially codimensional with the mat which the hood is to pick up. This opening is covered with a perforated plate 166 over which is placed a screen 168 (Fig. 10). As a result, when vacuum is applied to chamber 160 a mat brought into contact with plate 166 and screen 168 will be held securely.

The hood assembly is supported for movement in the feed direction of tilting conveyor 27. Accordingly it is provided with a plurality of wheels 170 mounted for rotation on a frame member of the hood and adapted to roll or tracks 172. These are located above conveyor 27 and extend a substantial distance beyond the same in the feed direction.

The hood assembly is driven reciprocably along tracks 172 by means of drive chains 176 which engage idler sprockets 178 and drive sprockets 180. Chains 176 ride on lower tracks 182 and upper tracks 184. The free ends of the chains are attached to the forward and rearward portions of the hood, the points of connection in Fig. 8 being indicated at 186.

Chains 176, and hence the hood are reciprocated by a drive illustrated in Fig. 2. As has been indicated above, chains 176 engage sprockets 180. These in turn are keyed to a drive shaft 190 which may be driven by motor 192 through any one of several connections, depending upon the desired speed and direction of driving of the hood.

Hence a motor 192 is coupled to a shaft 194 which may be driven continuously by the motor. To initiate the forward motion of the hood at a reduced speed, drive shaft 190 is coupled to shaft 194 through sprocket 196 on the former, sprocket 198 on the latter and interconnecting chain 200. This connection is accomplished by means of a clutch 202 which is operated by solenoids 204, 206. Solenoid 204 engages the clutch and is energized by switch 208 placed at a predetermined station in the path of travel of flying saw 24. Solenoid 206 disengages the clutch and is energized by a switch 210 placed in the path of travel of the vacuum hood 28.

When the vacuum hood is to be moved at a rapid rate, thus serving its important function as a mat speed changer, shaft 190 may be coupled to shaft 194 through sprocket 212 on the former and sprocket 214 on the latter, these being interconnected by chain 216. The connection is made by means of a clutch 218 on shaft 194. This clutch is operated by solenoid 220 which engages the clutch and solenoid 222 which throws the clutch out. Solenoid 220 is energized by switch 210, i.e. the same switch that energizes solenoid 206 and disengages clutch 202. Solenoid 222 is energized by a switch 224 which also is in the path of travel of hood 28 but at its extreme limit of forward travel.

When it is desired to reverse the motion of hood 28, shaft 190 may be coupled with shaft 194 by means of intermeshing gears 226, 228 keyed to the respective shafts. This connection is made through a clutch 230 on shaft 194.

Clutch 230 is engaged by means of solenoid 232 and disengaged by solenoid 234. The former solenoid is energized by means of a switch 236 stationed in the path of travel of jump conveyor 29. Solenoid 234 which disengages the clutch is energized by a switch 238 which is placed at the limit of return travel of vacuum hood 28. Thus the drive may be adjusted at reduced and increased forward speeds and at a predetermined reverse speed as required to handle the mat.

The vacuum system by means of which the hood is evacuated includes a pair of conduits 250, 252 which communicate respectively with the dome-shaped chambers 162, 164. These conduits communicate with a valve chamber 256 which communicates through a suitable valve structure with an extendable, bellows type conduit 260. It is mounted and supported for longitudinal extension, by means of a longitudinal track 262 to which it is connected at intervals by means of wheel-and-bracket assemblies 264 and connecting links 266. Conduit 260 in turn is connected to a source of vacuum, for example, vacuum fan 268 driven by motor 270.

Various types of valve constructions may be contained in valve chamber 256 for the purpose of alternately connecting and disconnecting the vacuum hood with the vacuum source. The valving arrangement illustrated schematically in Fig. 2 includes a valve plate 272 rigidly mounted on a shaft 274. A crank arm 276 also is rigid to this shaft and is connected to the piston rod of a fluid operated cylinder 280. This cylinder is operated through a valve 282 which in turn is actuated by solenoids 284, 286.

Solenoid 284 is energized by means of a switch 288 stationed in the path of travel of tilting conveyor 27. Solenoid 286 is energized by a switch 290 located in the path of travel of jump conveyor 29.

When solenoid 284 is energized by closure of switch 288, valve 282 is operated in such a manner that the piston rod of cylinder 280 is retracted, thereby moving valve plate 272 upwardly into a position wherein it closes off an opening 292 in the valve chamber. As a result, conduit 260 is connected through conduits 250, 252 to the vacuum hood and a vacuum is applied to plate 166.

However, when solenoid 286 is energized by closure of switch 290, valve 282 is operated in such a manner that the piston rod of cylinder 280 is extended. This shifts valve plate 272 into a position in which it closes off conduit 260 admitting air to the vacuum hood through opening 292 in valve chamber 256. This releases the vacuum on plate 166. Also, when conduit 260 is closed off by valve plate 272, motor 270 idles so that power requirements are kept at a minimum.

An alternate construction for a valving system to be included in the vacuum line by means of which the vacuum hood is operated is illustrated in Figs. 8 and 9. In this construction valve plate 300 is affixed to the end of the piston rod of cylinder 280. Reciprocation of the piston rod moves plate 300 between a first position in which it closes off extendable conduit 260 and a second position wherein it closes off an opening or port 302 which admits air from the atmosphere. Hence when the piston rod is extended, conduit 260 is sealed off and the vacuum hood is opened to atmospheric pressure. However, when the piston rod of cylinder 280 is retracted then conduit 260 is placed in communication with conduits 250, 252 and vacuum is applied to the vacuum hood.

*The jump conveyor*

The construction and mode of operation of jump conveyor assembly 29 is illustrated particularly in Figs. 2, 4 and 11.

The jump conveyor has for its function removing caul plate 30 from the caul return or side conveyor 32, permitting placement of a mat on the caul plate by vacuum hood 28 and transferring the caul plate and superimposed mat to the off-bearing conveyor or press loader injector 36. Accordingly caul plate 30 supported by belts 312 of side conveyor 32 are stationed directly above the jump conveyor.

The jump conveyor unit includes a plurality of live rolls 314 journaled between side plates 316 and driven through chain 318 by motor 320. A clutch 322 is included in the live roll drive assembly. It is operated by means of a solenoid 324 which in turn is energized by switch 236 located in the path of travel of the jump conveyor and energized by downward movement only of this conveyor.

Means are provided for stationing live rolls 314 in three vertical positions. In the first or rest position the rolls are substantially below the level of caul plate 30 as it rests on side conveyor belts 312. When the live rolls are in this position the side conveyor belts may be operated to bring in new caul plates as required.

In the second or elevated position, the live rolls are at an elevation such that caul plate 30 is maintained at the level indicated by the numeral 328 in Figs. 2 and 4.

In this position the caul plate is placed immediately adjacent or in contact with a mat carried by the vacuum hood in its advanced position so that upon release of the vacuum the mat will be transferred directly to the caul plate.

In the third position the live rolls are placed at an elevation such that the caul plate is maintained at the elevation indicated by numeral 330 of Figs. 2 and 4. In this intermediate position the caul plates are substantially on the same plane as the offbearing conveyor 36. Hence upon activating the live rolls the caul plate and superimposed mat is transferred to the offbearing conveyor.

In the illustrated embodiment, the elevating means employed for positioning the live rolls in these three positions include a pair of spaced apart, parallel, lower tracks 332. These are substantially aligned with the feed direction and are provided with upwardly inclined sections 334, 336.

A carriage of substantial construction rides on these tracks. It includes the forked longitudinal side pieces 338 and the cross piece and braces 340, 342, 344. A plurality of double wheel assemblies including outer wheels 346 and inner wheels 348 are mounted for rotation on side pieces 338. Outer wheels 346 ride on tracks 332. Inner wheels 348 track on and support the lower edge of side members 316 of the jump conveyor assembly, these edges accordingly serving as tracks which, like tracks 332, have inclined segments 352, 354. The direction of inclination of these segments, however, is opposite to that of inclined segments 334, 336 on the lower tracks 332.

The carriage assembly including frame members 338—344 may be driven stepwise by means of a double, fluid-actuated cylinder assembly including a first cylinder 360 and a second cylinder 362 connected together end to end and functioning as a single unit. The piston rod of cylinder 360 is pivotally connected to cross member 340 of the carriage. The piston rod of cylinder 362 is pivotally connected to frame member 364 which is secured to the ground.

Cylinder 362 is controlled by means of a valve 368 which in turn is operated by means of solenoids 370, 372 (Fig. 2). Solenoid 370 is in an electric circuit with and actuated by switch 224 which is in the path of extreme forward travel of the vacuum hood. Solenoid 372, on the other hand, is in an electric circuit with and energized by a diaphragm-operated switch 374 which is mounted on the vacuum hood and is responsive to changes in air pressure therein.

The flow of fluid through cylinder 360 is controlled by means of a solenoid-operated valve 376. This valve is operated by means of solenoids 378 and 380.

Solenoid 378, like solenoid 370, is energized by switch 224 which is near the limit of travel of the vacuum hood. Solenoid 380, on the other hand, is energized by means of limit switch 238 which is stationed at the extreme limit of return travel of the vacuum hood.

Accordingly, when switch 224 is closed by the forward motion of the vacuum hood, solenoids 370, 378 open valves 368, 376 to extend the piston rods of both cylinders. This elevates the jump conveyor until the caul plate on the side conveyor is contacted and raised to position 328.

As the jump conveyor elevates, however, contact element 238 thereon contacts switch 290, operating solenoid 286 and releasing the vacuum in the vacuum hood. This in turn operates diaphragm switch 374 which is in an electric circuit with solenoid 372 and energizes the same.

Energization of this solenoid causes retraction of the piston rod of cylinder 362 but does not affect cylinder 360. Accordingly the jump conveyor is lowered to its intermediate position wherein the caul plate is maintained at the level indicated by line 330.

In this intermediate position switch 236 is closed, which operates solenoid 324 and throws in clutch 322. This energizes the live rolls 314 of the jump roll assembly passing the caul plate and superimposed mat onto the offbearing conveyor 36.

Return of the vacuum hood to its starting position closes switch 238, which energizes solenoid 380. This operates valve 376 and causes retraction of the piston rod in cylinder 360. This in turn lowers the jump conveyor assembly to its rest position, ready for the introduction of another caul plate by the side conveyor 32.

From the more detailed disclosure of Figs. 4 and 11 it will be observed that the stepwise movement of the jump conveyor assembly is accomplished in the embodiment of those figures by reciprocation of the carriage including wheels 346, 348. Closure of switch 224 by motion of the vacuum hood actuates both of cylinders 360 and 362 and moves the carriage to the left.

As it moves, outer wheels 346 ride up inclined planes 334, 336 on tracks 332. Also, inner wheels 348 traverse the inclined planes 352, 354 on the lower edges of side plates 316. As a result, the jump roll assembly is elevated to its extreme position, or to a distance determined by the extent and degree of inclination of the inclined planes.

However, when the vacuum is released in the vacuum hood and diaphragm-actuated switch 374 is closed, valve 368 retracts the piston in cylinder 362. This moves the supporting carriage to the right a distance sufficient to cause the traversal by outer wheels 346 of inclined planes 334 and 336 on track 332 only. As a consequence, the jump conveyor assembly is lowered to the position in which it supports the caul plate at level 330.

Then closure of switch 238 by return of the vacuum hood to its starting position energizes solenoid 380 and operates valve 376 of cylinder 360. This retracts the piston rod of that cylinder, moving the carriage supporting the jump roll assembly a further distance to the right. This distance is sufficient to cause the traversal by inner wheels 348 of the carriage of inclined planes 352, 354 with the result that the jump roll assembly is lowered to its rest position.

To stabilize the jump roll assembly and prevent its lateral movement during the sequence described above, there are provided a pair of stabilizing arms 390 (Figs. 4 and 11). These are pivotally connected at one end to brackets 392 which are connected to a frame member 394 of the jump conveyor. At the other end they are pivotally connected to brackets 396 which are rigid to structural member 364. Accordingly lateral movement of the jump conveyor assembly is prevented.

*Operation*

The operation of the presently described mat transfer apparatus is as follows, particular reference being made to Figs. 1 and 2.

A continuous mat 50 produced in felter 20 and partially consolidated in pre-press 22 passes beneath flying saw 24 which cuts it into sections 60, 62. These sections in closely end-edge-abutting relationship pass continuously onto the tilting conveyor 27.

The working stretch of belt 64 of this conveyor is adjusted by jack screws 150 until the space between the belt and the face of vacuum hood 28 is substantially uniform at all points. This adjustment, as well as the elevation adjustment of cylinder 78 by jack screw 126 (Fig. 3) insures satisfactory operation of the apparatus upon mats of varying thickness.

As the flying saw reaches a predetermined position in its travel, it closes switch 208. This, operating through solenoid 204 throws in clutch 202 and rotates drive shaft 190 at a relatively slow rate. The drive shaft in turn drives vacuum hood 28 through chains 176.

In the initial stages of its motion the vacuum hood closes switch 84 which actuates cylinder 78 and elevates the pivoting conveyor 27. Tilting of the conveyor closes switch 288. This energizes solenoid 284 which operates valve 282, retracting the piston rod of cylinder 280 and closing off opening 292 of vacuum chamber 256 so that vacuum is applied to the vacuum hood by vacuum fan 268 and the hood picks up mat 62.

Further movement of the vacuum hood closes switch 86 which causes retraction of the piston rod in cylinder 78, lowering the conveyor.

Further progress of the vacuum hood and the mat which it carries results in closing switch 210. This switch throws out clutch 202 and throws in clutch 218, thereby disconnecting the slow drive and connecting the accelerated drive. As a result, the vacuum hood assembly moves more rapidly and separates the mat which it carries from the succeeding mats on the tilting conveyor so that the cycle of operations may be timed accurately.

When the vacuum hood reaches its position of extreme advancement it contacts switch 224. This throws out clutch 218, arresting the motion of the hood. It also operates valves 368, 376 so that the piston rods of cylinders 360, 362 are fully extended. Extension of these rods elevates the jump conveyor assembly 29 until the rolls 314 thereon contact and support caul plate 30 in the elevated position of line 328.

As the jump conveyor elevates, it contacts switch 290 which operates cylinder 280, extending the piston rod thereof and moving valve plate 272 to the position in which it closes off the extendable vacuum conduit 260. Atmospheric air then enters the vacuum chamber 256 through opening 292, breaking the vacuum in the vacuum hood and permitting the mat to drop down on the caul plate.

As the vacuum is released in the hood, diaphragm-actuated switch 374 energizes solenoid 372 which in turn operates valve 368 in such a manner that the piston rod of cylinder 362 is retracted. This results in the lowering of the jump roll assembly until the caul plate and mat supported thereby are lowered in the intermediate position 330.

Lowering of the caul plate closes switch 236 which throws in clutch 322 of the live roll assembly carried by the jump conveyor. The rolls thereupon drive the caul plate and superimposed mat onto the offbearing conveyor 36 which transfers them to the press loader.

Closure of switch 236 also throws in clutch 230 so that the reverse drive is started for returning the vacuum hood to its starting position during the time interval in which the caul plate and mat are being transferred to offbearing conveyor 36.

When the vacuum hood reaches the extreme limit of its return travel, it contacts switch 238. This throws out clutch 230, stopping the return drive. It also actuates cylinder 360, retracting the piston rod thereof and lowering the jump roll assembly to its rest position where another caul plate 30 may be placed over it by the side conveyor 32.

Accordingly it will be apparent that by the present invention we have provided a vacuum mat transfer apparatus which may be included to advantage in an automatic, continuous production line for forming wood particles into a mat and consolidating the mat into composition boards of the desired thickness and density. The entire operation may be carried out substantially automatically with a minimum of plant personnel. It may be carried out with a minimum of equipment since the herein described mat transfer also acts as a speed changer and eliminates a separate speed changing unit. The operation of the vacuum hood is such that even though the mats are susceptible to damage, they may be handled rapidly and efficiently.

It is to be understood that the form of our invention herewith shown and described is to be taken as a preferred example of the same and that various changes in the shape, size and arrangement of parts may be made without departing from the spirit of our invention or the scope of the subjoined claims.

Having thus described our invention, we claim:

1. Mat transfer apparatus comprising first driven conveyor means adapted to convey a succession of mats continuously in a substantially horizontal predetermined line of travel, vacuum hood means including a perforated planar mat support positioned over the first conveyor means, means for alternately elevating and lowering a segment of the first conveyor means until a mat carried thereby is engaged and supported by the mat support, means for driving the mat support in the line of travel of the first conveyor means a spaced distance beyond the same, second conveyor means aligned with the first conveyor means and positioned for receiving mats from the mat support, and vacuum control means for applying vacuum to the mat support for lifting a mat from the first conveyor means and for releasing the mat on a caul plate carried by the second conveyor means.

2. The mat transfer apparatus of claim 1 wherein the segment of the first conveyor means includes means for pivotally mounting its infeed end, means for alternately raising and lowering its outfeed end and means for maintaining uniform the space between the conveyor means and the mat support.

3. The mat transfer apparatus of claim 1 wherein the vacuum hood means comprises a hood, track means stationed in the feed direction of the conveyor, means for mounting the hood on the track means, drive means for reciprocating the hood on the track means, a source of vacuum, an extendable conduit interconnecting the vacuum hood and the vacuum source and extendable in the said direction of reciprocation, and valve means included in the extendable conduit for alternately applying vacuum to the hood and releasing it therefrom.

4. The mat transfer apparatus of claim 1 wherein the second conveyor means comprises a jump conveyor assembly including a plurality of live rolls aligned with the path of travel of the first conveyor means, drive means connected to the live rolls for periodically driving them in the mat feed direction, means for positioning a caul plate above the live rolls, and elevating means connected to the live rolls for elevating them until they engage the caul plate and mat successively.

5. The mat transfer apparatus of claim 4 wherein the means for elevating the live rolls comprises a carriage supporting the live rolls, inclined plane means supporting the carriage, and driving means for reciprocating the carriage with respect to the inclined plane means, thereby elevating the carriage and live rolls mounted thereon.

6. The apparatus of claim 4 including means controlled by movement of the live rolls from said elevated position to a lower position for activating the drive means and live rolls whereby to propel a mat supporting caul plate from the live rolls.

7. The apparatus of claim 1 including control means operated by the mat support at a predetermined position along its path of travel for controlling the elevating and lowering of the said segment of the first conveyor means.

8. The apparatus of claim 1 including actuating means operated by the mat support at one position thereof to actuate the vacuum control means to lift the mat and at a second position of the mat support to actuate the vacuum control means to release the mat.

9. The apparatus of claim 1 including means operated by the mat support at a predetermined position along its path of travel after lifting the mat to move the mat support at increased speed.

10. The apparatus of claim 1 including means for moving the second conveyor between a first position for receiving a caul plate, a second position for deposit of a mat on a caul plate, and a third position for removal of the mat supporting caul plate therefrom.

11. The apparatus of claim 9 including means operated by the mat support at a predetermined position along its path of travel for moving the second conveyor from said first position to said second position, means operated by the second conveyor upon its movement to said second position for releasing the vacuum in said vacuum hood means whereby to release the mat from the mat support when the second conveyor is in said second position, and means controlled by said release of vacuum to move the second conveyor from said second position to said third position.

12. The apparatus of claim 1 including means for moving the second conveyor between a lowered position for receiving a caul plate, an elevated position for deposit of a mat on a caul plate, and an intermediate position for removal of a mat supporting caul plate therefrom.

13. A vacuum hood assembly comprising a hood-shaped member having a perforated lower planar face adapted to contact a mat, an elongated track, drive means connected to the hood-shaped member for reciprocating the same along the track, evacuating means mounted in fixed position adjacent one end of the track, a bellows-like conduit interconnecting the hood-shaped member and evacuating means for extension and retraction in the direction of the track during reciprocation of the hood-shaped member and valve means included in the conduit for alternately connecting the hood-shaped member with the evacuating means and for disconnecting it therefrom.

14. A conveyor comprising a plurality of live rolls, live roll support means arranged for vertical movement and confined against horizontal movement, track means on the live roll support means, a carriage mounting the live roll support means and engaging the track means of the latter, second track means supporting the carriage, inclined plane means on at least one of the track means, and drive means connected to the carriage for reciprocating the same horizontally with respect to the inclined plane means, thereby alternately raising and lowering the live rolls during said reciprocation.

15. The conveyor of claim 14 including a plurality of said inclined plane means spaced apart longitudinally in the direction of reciprocation of the carriage.

16. The conveyor of claim 14 including inclined plane means on both track means and arranged to extend toward each other in opposite directions of inclination and displaced from each other in the direction of reciprocation of the carriage, whereby to afford vertical adjustment of the live rolls in stepwise increments.

References Cited in the file of this patent

UNITED STATES PATENTS

| | | |
|---|---|---|
| 1,310,187 | Hodgson | July 15, 1919 |
| 1,327,436 | Larson | Jan. 6, 1920 |
| 1,461,707 | Hanson et al. | July 10, 1923 |
| 1,952,730 | Remde | Mar. 27, 1934 |
| 2,024,949 | Schefe | Dec. 17, 1935 |
| 2,049,850 | Lytle et al. | Aug. 4, 1936 |
| 2,234,162 | Anderson | Mar. 11, 1941 |
| 2,391,053 | Jackson | Dec. 18, 1945 |
| 2,578,871 | Woldring | Dec. 18, 1951 |
| 2,598,222 | Cahners et al. | May 27, 1952 |
| 2,609,108 | Peterson et al. | Sept. 2, 1952 |
| 2,665,013 | Socke | Jan. 4, 1954 |
| 2,716,497 | Wahl | Aug. 30, 1955 |

FOREIGN PATENTS

| | | |
|---|---|---|
| 423,368 | Italy | July 14, 1947 |